(Model.)
2 Sheets—Sheet 2.
C. F. KELLER.
Harvester Reel.
No. 241,669.              Patented May 17, 1881.
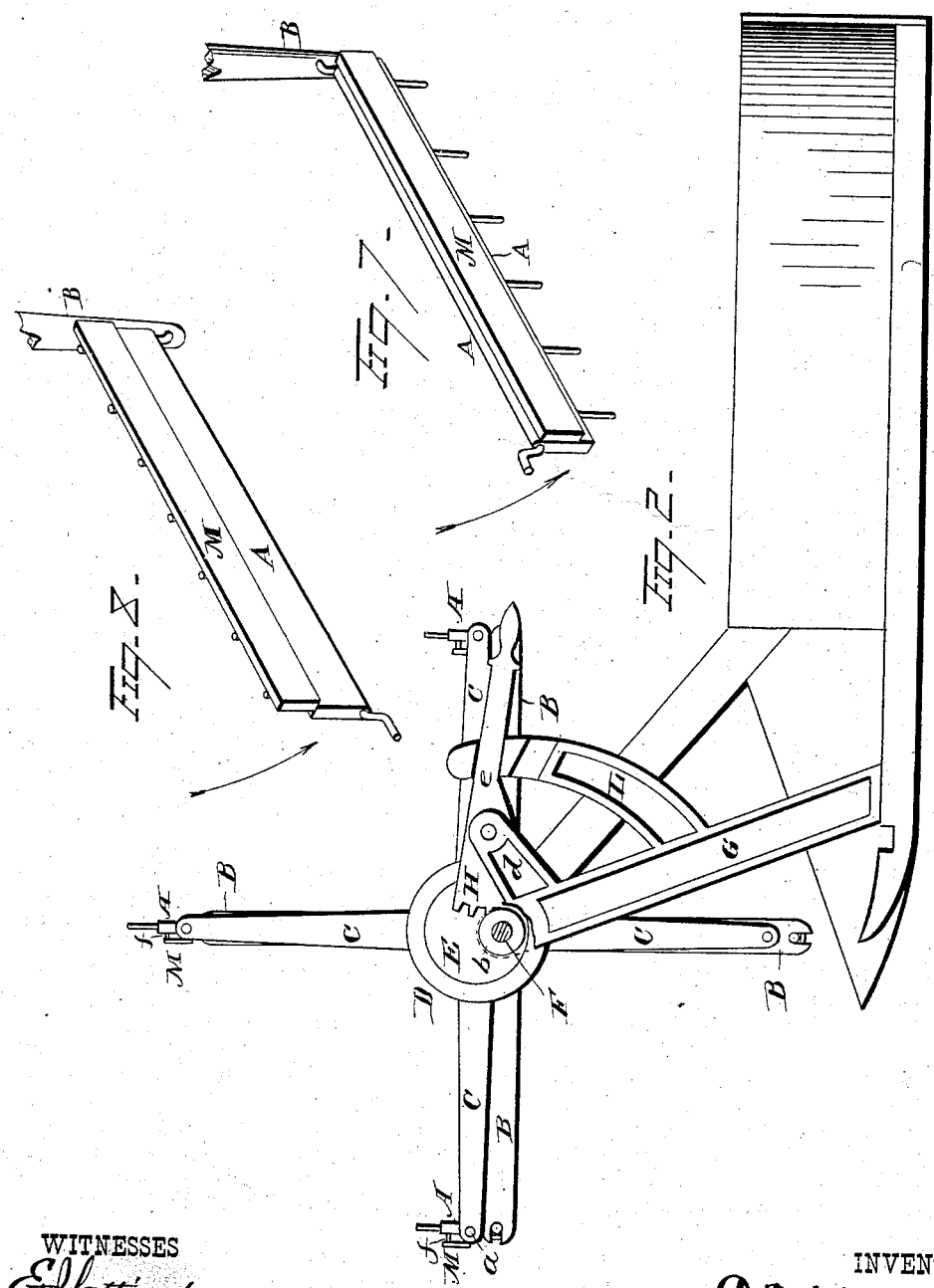

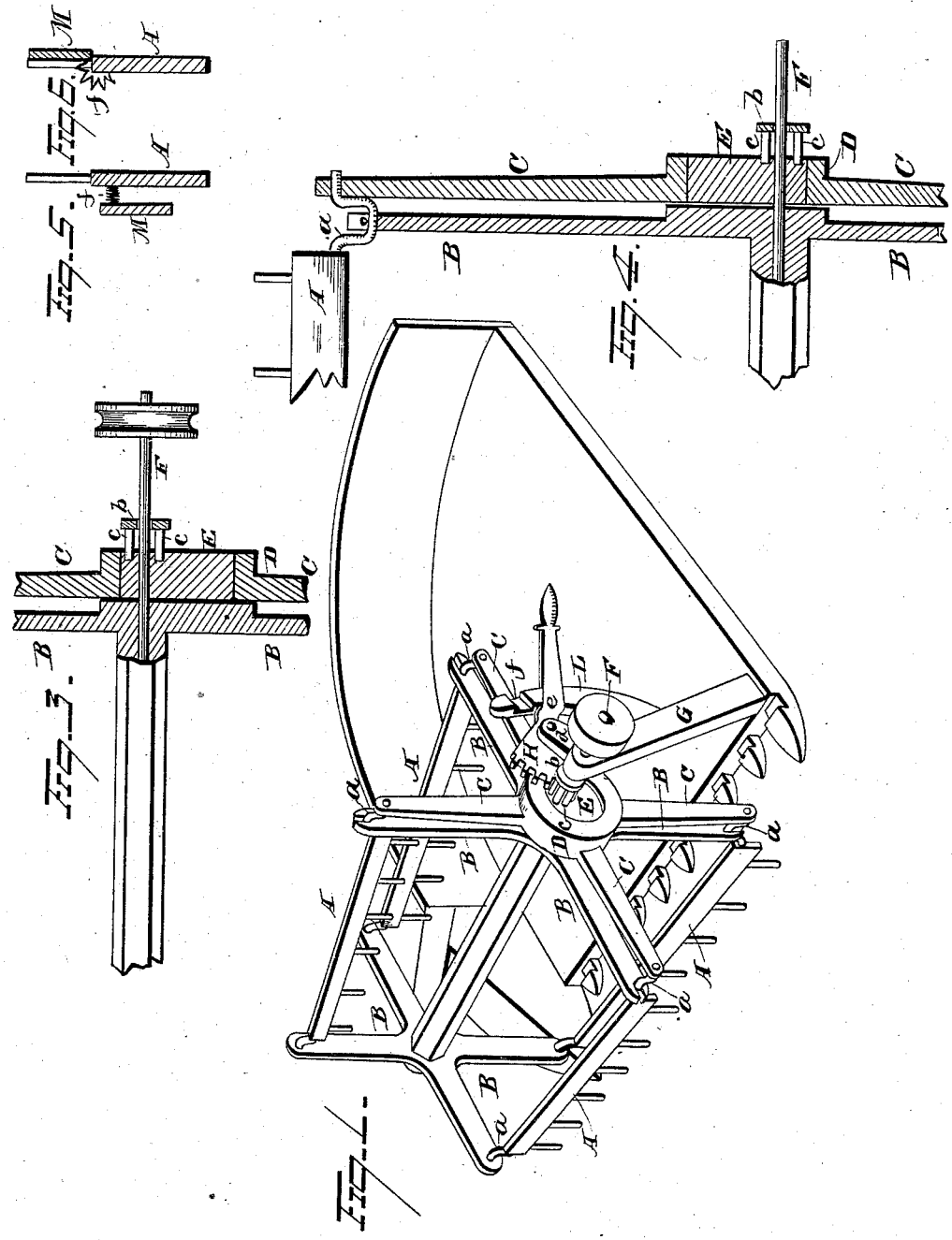

UNITED STATES PATENT OFFICE.

CHAUNCY F. KELLER, OF LIMA, OHIO.

HARVESTER-REEL.

SPECIFICATION forming part of Letters Patent No. 241,669, dated May 17, 1881.

Application filed January 3, 1881. (Model.)

*To all whom it may concern:*

Be it known that I, CHAUNCY F. KELLER, of Lima, in the county of Allen and State of Ohio, have invented certain new and useful Improvements in Harvester-Reels; and I do hereby declare the following to be a full, clear, and exact description of the invention, such as will enable others skilled in the art to which it pertains to make and use it, reference being had to the accompanying drawings, which form part of this specification.

The ordinary harvester-reels are not provided with any means for adjusting their rakes so as to permit the latter to be operated with either their plain heads or their teeth adapted to engage with the grain. The nearest approach thereto is a reel adapted to maintain the rakes with their teeth more or less inclined to the vertical in either direction, such inclination corresponding to the condition of the grain with which the teeth of the rakes are to engage. The above reel, however, is not adapted to cause the plain heads of the rakes to engage with the grain. It is necessary that its teeth be always directly engaged with the grain, though they may be maintained at different vertical inclinations thereto.

The object of my invention is to maintain the rakes with either their plain heads or their teeth in position to engage with the grain, accordingly as the condition of the latter may require. When the grain is standing well the rakes are maintained in a position which causes their teeth to project upward and their plain heads to project downward. When the grain is lodged or cast down the rakes are maintained in a position which causes their teeth to project downward and their plain heads to project upward.

To carry out the invention I journal the rakes in the reel-arms and connect them by cranks with the radial arms of a spider, which latter is journaled on an adjustable eccentric-bearing. This mechanism is substantially the same as is employed in the case of the reel previously referred to, which is adapted to maintain the rake-teeth in greater or less vertical inclination. Hence it will be understood that my improvement does not cover said specified mechanism by itself, but merely includes the same as part of the combination employed in carrying out the broad principle of my invention. The adjustable eccentric-bearing is adapted to be turned either to the right or the left a sufficient distance to throw the major portion of the eccentric-bearing to one side of the reel-shaft, the spider being thereby moved so as to cause the several cranks to turn the rakes in their bearings through a circular arc of about one hundred and eighty degrees. This results in causing the teeth to point in a direction diametrically opposite to that in which they were pointing previous to the turning of the eccentric-bearing. Suitable means are employed to effect this turning of the eccentric-bearing and to maintain it in its adjusted position, and my invention covers such means.

My preferable form of means for accomplishing the foregoing result is shown in the drawings, and this particular mechanism is covered by my invention, whether it serves to adjust the rake-teeth in a complete arc of one hundred and eighty degrees or in any fraction of said arc.

From the foregoing it will be understood that my invention covers, broadly, means for holding the eccentric-bearing in such adjusted positions as will cause the rakes to be maintained with their teeth projecting vertically downward or vertically upward, as the case may be.

The invention further covers the novel form of mechanism shown for maintaining the eccentric-bearing in adjusted position, whether said adjustment serves to maintain the teeth projecting downward in greater or less vertical inclination or serves to maintain the teeth projecting vertically upward.

The invention further covers a novel form of shield for the rake-teeth, said shield being of a width substantially equal to the length of the teeth, and located on the forward side of the latter as the rake moves toward the platform. Yielding connecting devices secure the upper longitudinal portion of the shield to the rake.

Referring to the drawings, Figure 1 is a perspective view of the reel, showing the rakes with their teeth projecting downward. Fig. 2 is a view in side elevation, showing the rakes with their teeth projecting upward. Fig. 3 is a detail view, in transverse vertical section, of the hub of the spider in a plane passing through the reel-shaft, the parts being in the position they assume when the rake-teeth project downward. Fig. 4 is a view similar to the preceding view, but showing the parts in the position they assume when the rake-teeth project upward. Figs. 5 and 6 are detail views, illustrating the manner of connecting the shield to the rake. Fig. 7 is a view in perspective of the rake with shield attached thereto and located in its inoperative position; and Fig. 8 is a similar view, showing the shield secured in position for preventing the grain from catching in the teeth of the rake.

Each rake A has its two extremities journaled in the appropriate reel-arms B, the inner extremity being connected by a crank, a, with the appropriate spider-arm C. The hub D of the spider is journaled on an eccentric, E, which latter is directly mounted on the reel-shaft F, said shaft passing loosely through a hole formed in the eccentric. The inner extremity of the reel-shaft is journaled in a standard, G. Between the latter and the eccentric a ring, b, is loosely mounted on the shaft, and rods c extend laterally from the appropriate face of the eccentric to said ring. The ring and its rods constitute a wheel, with which the teeth of a sector-lever, H, engage. This lever is pivoted to an arm, d, projecting from the standard G. Its handle, formed of spring metal, is bent at e, and is adapted to be sprung into the appropriate one of the lateral notches f. Said notches are formed in an upright, L, projecting from standard G. When the grain is in condition to be easily cut, standing well up from the ground, the lever-handle is moved to the upper notch of the upright. This moves the eccentric into a position in which its greater portion is located in a horizontal plane above the reel-shaft, the hub of the spider being moved so that the spider-arms operate the several cranks to turn the rakes in their bearings through the arc of half a circle. The teeth of the several rakes are thrown upward in vertical projection, and the plain heads of the rakes are caused to project vertically downward. The lever-handle is caught in the upper notch, and the parts are held in the described position. The reel can then be operated as usual, the heads of the rakes engaging directly with the standing grain and the teeth of the rakes remaining idle. When, however, the grain is down on the ground, is lodged, or is otherwise in such a condition that the rake-teeth are desirable in use, the handle of the lever is moved to the lower notch of the upright. This moves the eccentric into a position wherein its greater portion is located in a horizontal plane below the reel-shaft, the hub of the spider being moved so that the spider-arms operate on the cranks to cause the latter to turn the rakes in their bearings through a half-circle. The teeth of the rakes are thrown downward in vertical projection, and the plain heads of the rakes are thrown upward in vertical projection. The reel can then be operated as usual, with the teeth of the rakes in direct engagement with the grain.

In the drawings the notches in the upright are adapted to secure the lever in the two described adjustments; but, if desired, other notches may be formed intermediate of the two shown, and thereby adapt the lever to be held in such position as to maintain the rake-teeth in any vertical inclination. Each rake is provided with a shield, M, formed of width substantially equal to the length of the rake-teeth, the shield being located on the forward side of the teeth as the rake moves toward the platform, and thereby adapted to guard the teeth and prevent the grain catching in the teeth and being carried over the reel when the reel is operated with the backs of the rakes turned downward. When the shield M is not in use it is retained in the position illustrated in Fig. 5, the coiled spring f serving to keep it out of operative position. Now, when it is desired to place the shield in position for operation, the free side or edge is turned upward by hand in line with the teeth, and the shield is then drawn upwardly over the teeth, and the spring f operates to draw one edge thereof against the outer edge of the rake-head and hold it in the position shown in Fig. 6.

Having fully described my invention, what I claim as new, and desire to secure by Letters Patent, is—

1. In a harvester-reel, the combination, with a series of rakes journaled in the reel-arms, a spider journaled on a rocking cam, and cranks respectively connecting the spider-arms with the rakes, of an adjusting device adapted to maintain said cam in positions which cause the rake-teeth to project upward or downward, as the case may be, substantially as set forth.

2. In a harvester-reel, the combination, with rakes journaled in the reel-arms, a spider journaled on a rocking cam, and cranks respectively connecting the spider-arms with the rakes, of an adjusting device adapted to maintain said cam with its greater portion located in a horizontal plane above or below the reel-shaft, and thereby cause the several rakes to be maintained in operative position, with their teeth projecting vertically up or vertically down, as desired, substantially as set forth.

3. In a harvester-reel, the combination, with rakes journaled in the reel-arms, a spider journaled on a rocking annular cam, and cranks respectively connecting the spider-arms with the rakes, of a wheel secured to the cam, a lever engaging with the wheel, and a catch which maintains the lever in adjusted position, said parts being adapted to operate to maintain the rakes with their teeth projecting up or down, as desired, substantially as set forth.

4. In a harvester-reel, the combination, with rakes journaled in the reel-arms, a spider journaled on a rocking cam, cranks respectively connecting the rakes with the spider-arms, and a reel-shaft on which the cam is journaled, of a ring fitted on the shaft between the standard and cam, rods projecting from the ring to the cam, a sector-lever engaging with the rods, and a catch which maintains the lever in adjusted position, substantially as set forth.

5. In a harvester-reel, the combination, with rakes journaled in the reel-arms, a spider journaled on an annular rocking cam, and cranks respectively connecting the spider-arms with the rakes, of a wheel secured to the outer face of the cam, a lever engaging with the wheel and provided with a spring-metal handle, and an upright having lateral notches in which said handle is fitted, substantially as set forth.

6. The combination, with a rake and mechanism for causing either the teeth or back of the rake-head to act on the grain, of a shield attached to the rake-head and adapted to be secured against the rake-teeth and prevent grain from catching thereon, substantially as set forth.

7. The combination, with a rake and mechanism for reversing the position of the rake-head and causing either the teeth or back of the rake-head to act on the grain, of a shield secured to the rake-head by elastic or yielding connections, whereby the shield may be drawn outwardly and over the teeth and secured against the sides of the latter, substantially as set forth.

In testimony that I claim the foregoing I have hereunto set my hand this 27th day of December, 1880.

CHAUNCY F. KELLER.

Witnesses:
O. W. SMITH,
O. F. KEMMER.